United States Patent [19]

Bossen et al.

[11] 3,893,070

[45] July 1, 1975

[54] ERROR CORRECTION AND DETECTION CIRCUIT WITH MODULAR CODING UNIT

[75] Inventors: Douglas C. Bossen, Wappingers Falls; Vincent A. Cordi, Vestal; Mu-Yue Hsiao, Poughkeepsie; Barry N. Shiffrin, Endicott, all of N.Y.; Ellis W. Glick, Deerfield, Ill.

[73] Assignee: IBM Corporation, Armonk, N.Y.

[22] Filed: Jan. 7, 1974

[21] Appl. No.: 431,530

[52] U.S. Cl. .......................................... 340/146.1 AL
[51] Int. Cl. .......................................... H04l 1/10
[58] Field of Search .......................................... 340/146.1 AL

[56] References Cited

UNITED STATES PATENTS 3,745,525 7/1973 Hong et al. ................ 340/146.1 AL

*Primary Examiner*—Charles E. Atkinson
*Assistant Examiner*—R. Stephen Dildine, Jr.
*Attorney, Agent, or Firm*—William S. Robertson

[57] ABSTRACT

An error correction and detection circuit includes a modular encoder that provides the minimum number of check bits for encoding a particular number of data bits. Means is provided for combining several units to produce the minimum number of code bits when a larger data word is to be encoded. A storage hierarchy system using this error correction circuit is also disclosed.

7 Claims, 5 Drawing Figures

PATENTED JUL 1 1975 3,893,070

SHEET 1

FIG. 2 (PRIOR ART)
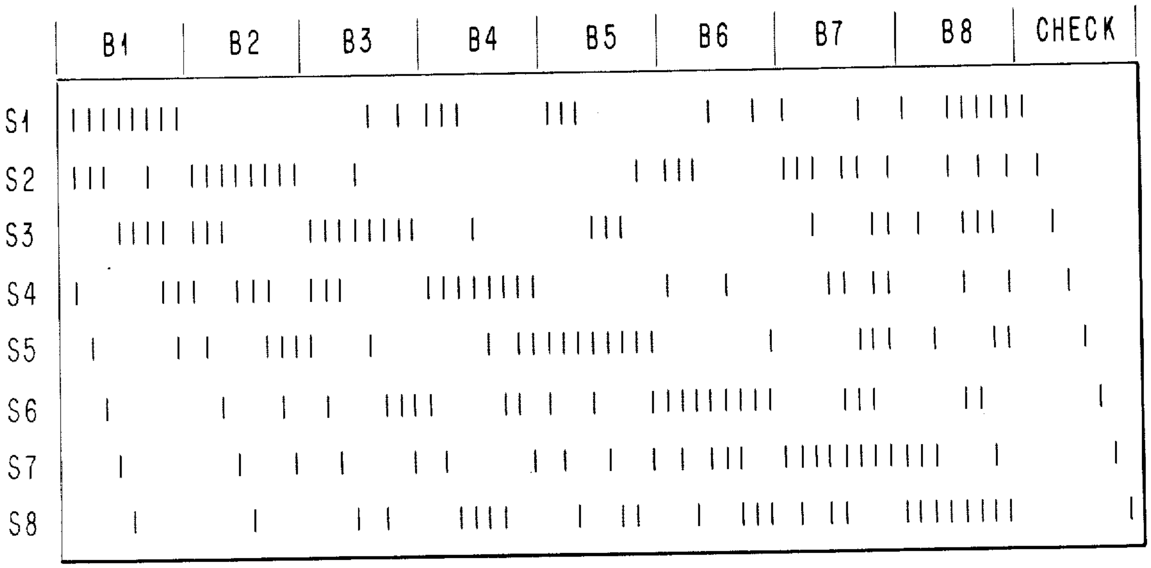
FIG. 3
$$H128 = \begin{bmatrix} H64 & H'64 & I8 \\ 064 & 164 & I1 \end{bmatrix}$$
FIG. 4
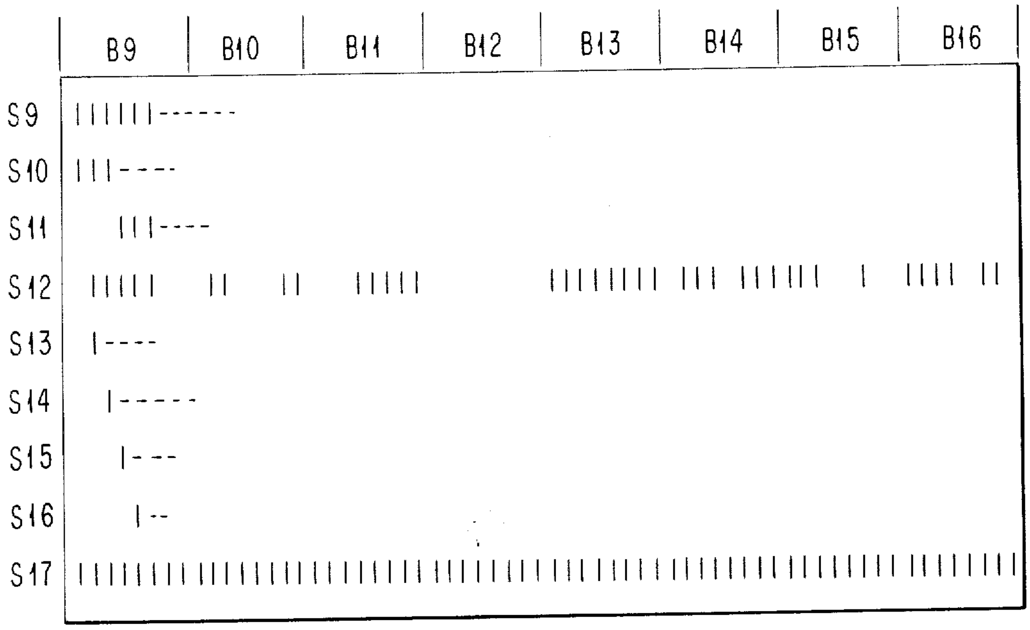

ERROR CORRECTION AND DETECTION CIRCUIT WITH MODULAR CODING UNIT

INTRODUCTION

In a data storage system for a data processing system, binary data is commonly stored in an array of bistable circuit devices. For example, a 1 or a 0 bit can be represented by the presence or absence of a charge on a capacitor or conduction in one or the other of two interconnected transistors. For generality, an element of the array is called a storage cell. The array can be thought of as having two dimensions with the cells of a row forming a data unit called a word and the cells of a column forming a particular bit position in all of the array. A word typically has a small number of data bit positions, for example 64 or 128, but there are typically many thousands of words in the array. An operation to enter a word into the store is called a "store" operation and an operation to retrieve a word from the store is called "fetch" operation.

Because the circuit devices of a storage cell may occasionally fail, data stores commonly have error correction code (ECC) circuits that detect or correct errors. A code that will be discussed later is capable of single error correction (SEC) and double error detection (DED). Many present day array storage systems use a form of the error correction code of Hamming, U.S. Pat. No. Re. 23,601, in which each check bit is the Exclusive OR function of a unique set of data bits such that two data words that differ at only one bit position produce distinctively different check bit patterns from which the location of the differing bit can be found. The data word that is to be stored is encoded to form the check bits and is stored in the array with its check bits. When the word is read from the store, the data portion is re-encoded and the new check bits are compared with the check bits read from the store. If there has been no error between the time of originally storing the word and subsequently fetching it, the two sets of check bits agree. If an error has occurred in one of the data bit or check bit positions, the comparison operation produces a pattern of bits (called the "syndrome") that uniquely identifies the bit position in error. If two or more bits are in error, the syndrome cannot be properly interpreted to identify either error and it may incorrectly indicate that no error exists. Such a double error can be detected (but not corrected) by an additional bit that is the parity of the entire word (since the word with a double error will have the opposite parity from the same word with a single error).

Many commercially available stores have a word of 72 bits made up of 64 data bits, 7 single error correction bits and 1 double error detection bit. Such an error correction circuit has 64 inputs from the data bits of the word to be stored or the word fetched from the store and it produces 8 check bits at its output. A network of Exclusive OR circuits form each of the 8 output bits from the 64 input bits. For comparing the two sets of check bits and forming the syndrome bits, there are additional Exclusive OR circuits with 8 pairs of inputs and 8 outputs. Thus, the error correction circuits add to the cost and complexity of the memory, they introduce time delays in some situations, and they are an additional source of possible component failure in the storage system. Accordingly, it is a general goal in this art to provide modular error correction circuits so that an ECC circuit of one design can be used for data stores of various word lengths.

As one example of a modular ECC circuit, the error correction circuit for a word of 64 data bits has been used with a store having a word size of 128 data bits by dividing the data output register of the store into two parts that each have 64 data bits and 8 check bits. Two error correction circuits then operate independently to detect double errors and correct single errors in each of the 72 bit parts of the 144 bit word. In another ECC circuit of the prior art (Canadian Pat. No. 874,088) an error correction circuit for a particular word length such as 72 bits, is used with a shorter word length by supplying the entire 128 data bits to the input of a unified ECC circuit. An object of this invention is to provide an ECC circuit that uses modular units but provides the minimum number of ECC bits. In contrast to the second example, the ECC circuit of this invention provides a modular unit that is suitable for a small data word and provides means for combining one module with similar modules for a multiple width word. A unit for a smaller word width is inherently faster and less complex than a unit for a wider word width. (The technique of Canadian Pat. No. 874,088 can be used for a word size that is not a multiple of the data width of the ECC module.)

U.S. Pat. No. 3,560,942 to C. J. Enright, Jr. shows a prior art example of an error correction circuit that is shared by two data stores. When a separate error correction circuit is provided for each store, the additional circuits do not ordinarily supplement each other but instead they increase the likelihood that a component failure will occur. The modular units of this invention are readily adapted to be shared.

Some error correction codes have a modular construction that is used in designing codes for various word lengths. The error correction code of U.S. Pat. No. 3,573,728 to Eugene Kolankowsky and August K. Pattin, Jr. illustrates this kind of modularity. For a 64 bit data word, one of the check bits is the parity (Exclusive OR) function of the first 32 bits of the word. Thus, a correctable error is located as being in the first half of the word when the corresponding syndrome bit is a 1 and is located as being in the second half of the word when this syndrome bit is a 0. Another check bit is a parity function of the second and fourth quarters of the word, another is a parity function of the second, fourth, sixth and eight eighths of the word, and so on, to the last bit of the code which is a parity function of all even numbered bits. To provide the same code for a word of 32 bits, the first of these SEC bits is eliminated. To provide the same code for a data word of 128 bits, these SEC bits are arranged to form the same checking pattern for the additional 64 data bits and a new SEc bit is provided that is the parity function of all 64 bits of the original 64 data bits. The Exclusive OR network comprises, in effect, duplicate networks for each half of the 128 bit data word and an additional level of the Exclusive OR circuits that combines corresponding check bits from the two halves of the data word. This technique is used in part in the SEC DEC circuit of this invention and will be explained in more detail later.

The circuit of this invention preferably uses the error correction code of Mu Yue Hsiao and Eugene Kolankowsky — U.S. Pat. No. 3,623,155. As will be explained next, an object of this invention is to provide a new and improved error correction circuit in which the code of Hsiao et al is a modular unit.

SUMMARY OF THE INVENTION

The code of Hsiao et al is called an "odd weight" code because each data bit enters into the Exclusive OR function for an odd number of check bits. Thus, if a single error occurs, an odd number of syndrome bits will each be a 1 and a double error can be detected by the presence of a 1 bit in an even number of syndrome bit positions. (The circuit is faster than the circuit of Kolankowsky et al because a separate DED bit is not required.) One way of understanding the problem of providing a modular odd weight code is to consider that an additional check bit for identifying whether a single error has occurred in the upper half or lower half of the data word would cause the data bits in one half of the word to enter into an even number of check bit terms: the odd number of terms of the original code plus the added check bit; consequently, the odd weight of the code would be destroyed and double errors could not be detected.

According to this invention, the odd weight of such a code is preserved by providing means to convert one of the modular codes to an even weight code. The circuit of this invention then adds a check bit that identifies the location of a single error as being in the upper or lower half of the word and thereby restores the odd weight characteristic of the code. The changes are performed by logic circuits that are external to the physical package of the ECC module and the ECC modules are structurally identical.

The following detailed description of a preferred embodiment of the invention will continue this summary of the invention.

THE DRAWING

FIG. 1 shows the modular error correction circuit of this invention in a memory hierarchy system.

FIG. 2 is a matrix representation of an odd weight SEC DED code and is based on FIG. 2 of U.S. Pat. No. 3,623,155.

FIG. 3 is a mathematical equation that describes the single error correction, double error detection code circuit of this invention in a matrix of the general type illustrated by FIG. 2.

FIG. 4 is a matrix illustrating some of the components of the equation of FIG. 3.

THE CIRCUIT OF THE DRAWING

Figure 1:
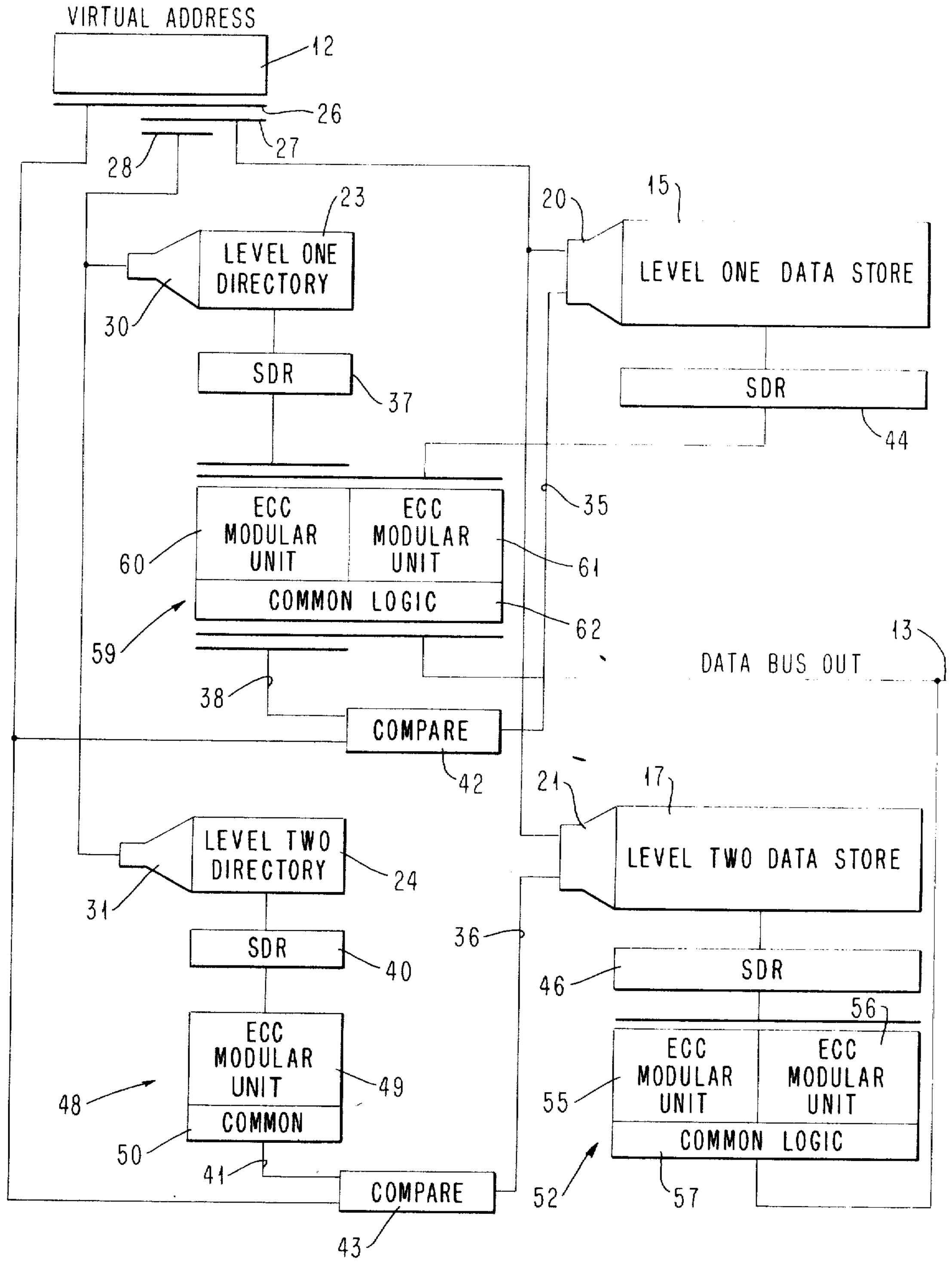

The Storage Hierarchy System of FIG. 1

FIG. 1 shows a storage hierachy system using the ECC modular units of this invention. Its components are typical of various known storage hierarchy systems and it is described only to the extent necessary to understand a particularly useful application for the ECC circuit of this invention. The system has a register 12 that receives an address of a storage word location where a fetch or store operation is to take place and a Data Bus Out 13 that carries a data word from the storage system to other components of the data processing system (the connection for supplying a data word to the storage system for a store or partial store operation are not shown in the drawing but will be readily understood). A relatively small, fast, Level One Data Store 15 holds data words that are most likely to be used by the associated components of the data processing system, and Level Two Data Store 17, which may be relatively larger and slower, holds words that are less likely to be used by the associated system. The general arrangement illustrated by FIG. 1 is preferably extended to several lower levels of larger but less easily accessible stores. Stores 15 and 17 are array storage devices of the general type already described; the lower level storage devices may use other types of data organization and ECC codes that are unlike the codes used in this invention. Each store 15, 17 has a word length of 137 bits, 128 data bits and 9 SEC DED bits.

Blocks of data that are going to be used are moved from the lower levels of storage to Levels one and two and blocks that have become unused are moved from Level one or Level two to the lower level. (A "block" is a multi-word unit of storage that can be identified by a particular set of the address bits, as will be explained later.) As a block is moved from one level to another, it acquires a different storage address but it retains a fixed identification that is called a "virtual address." The address loaded into register 12 is a virtual address but the address supplied to address circuits 20 and 21 of stores 15 and 17 are actual storage addresses. A Level One Directory 23 is used for keeping track of the relationship of the virtual address to the physical address for Level One Data Store 15 and Level Two Directory store 24 is used for keeping track of the relationship of a virtual address to a physical address in Level Two Data Store 17. Stores 23 and 24 are also array storage devices. They have a word length of 64 data bits and 8 SEC DED bits.

Lines 26, 27 and 28 show the connection of bit positions of virtual address regiister 12 to addressing components of the storage hierarchy system. The connections of line 27 provide an address to the addressing components 20 and 21 of Level One Data Store 15 and Level Two Data Store 17 for selecting a word location without regard to the virtual address of the data in stores 15 and 17. (Stores 15 and 17 receive the same number of address bits and are the same size; store 15 may be smaller and receives a subset of the address bits supplied to store 17.) The connections of line 28 are applied to addressing circuits 30, 31 of the Level One Directory 23 and Level Two Directory 24. The portion of the address that is supplied on line 28 to directory stores 23 and 24 identifies a multi-word block of storage in store 15 or 17 that contains the word location addressed by the address bits of line 27. Frequently, but not always, the word location in store 15 or 17 addressed on line 26 contains the data word identified by the virtual address in store 12. A word location addressed in Level One Directory 23 contains the virtual address of the block of storage actually in Level One Data Store 15, and a word fetched from Level Two Directory 24 contains the virtual address of the data in the corresponding block of Level Two Data Store 17.

During a storage access operation, the address of line 27 appears at the input of addressing circuits 20, and 21, but response to this address by circuit 20 or 21 is inhibited by signals on lines 35, 36. (An addressing circuit has a network of logic gates and lines 35, 36 are connected to inhibit appropriate one of these gates.) The virtual address of the data addressed in Level One Data Store 15 appears in the Storage Data Register (SDR) 37 of Level One Directory 23 and on a line 38.

Similarly, the virtual address of the location addressed in Level Two Data Store 17 appears in the Storage Data Register (SDR) 40 of Level Two Directory 24 and on a line 41. A Compare circuit 42 compares th virtual address in register 12 with the virtual address on line 38 and controls the signal on line 35 to access Level One Data Store 15 if the comparison is true and to inhibit the accessing operation if the comparison is false. Similarly, a Compare circuit 43 controls addressing circuit 21 to access Level Two Data Store 17 if the virtual address on line 41 of the Level Two Directory 24 is the same as the virtual address in register 12. If the virtual address is found in Level One Data Store 15, a word to be fetched is transferred from Storage Data Register 44 to Data Bus Out 13. Similarly, a word fetched from Level Two Data Store 17 is transferred from Storage Data Register 46 to the Data Bus Out 13.

An error correction circuit 48 corrects single errors and detects double errors in words fetched from or to be stored in Level Two Directory 24. ECC circuit 48 comprises an ECC Modular Unit 49 and a Common Logic Unit 50. ECC Modular Unit 49 is identical to other ECC modular units shown in FIG. 1, and Common Logic Unit 50 contains additional circuits to adapt the modular unit to operate with the Level Two Directory 24. The entire circuit 48 will be described first and it will be readily seen that many components will be located in Modular Unit 49, that some components are specific to the ECC circuit for the directory store, and are located in the Common Logic Unit 50, and that some components are used with most or all error correction circuits and may be located either in Modular Unit 49 or in the Common Logic Unit 50.

ECC circuit 48 contains an Exclusive OR network that receives the 64 data bits and the 8 SEC DED bits from the Storage Data Register 40 and produces 8 SEC DED bits (identified later as C1–C8) which are stored with the data word in the Level Two Directory 24, 8 parity bits (P1–P8), and 8 syndrome bits (S1–S8) that indicate the location of a single error and the occurrence of a double error. ECC circuit 48 also has a decoder that receives the 8 syndrome bits and produces a 64 bit output that identifies a data bit where a single error has occurred. Means is also provided for detecting the occurrence of a double error and signalling to the associated system that such an error has occurred. The patent to Kolankowsky et al and U.S. Pat. No. 3,568,153 to Gerald W. Kurtz and August K. Pattin, Jr. give examples of additional functions that may be performed in an error correction circuit.

According to this invention, many of these components are made as an integral component package that is identified by a single part number and used in a variety of applications, and only a few of these components are specially adapted to the particular application of the ECC circuit. The exclusive OR network has many components and is advantageously located entirely or nearly entirely in the Modular Unit 49. Components that are used in only occasional applications may of course be located in the Modular Unit 49 and connected to operate only where they are to be used. The art of circuit packaging is rapidly developing and those skilled in the art will readily find an advantageous assignment of circuit components to the ECC modular unit or to the common logic unit.

The ECC circuit 52 for the Level Two Data Store 17 comprises two ECC Modular Units 55, 56 and a Common Logic unit 57. Common Logic unit 57 has components for performing the general functions explained in the description of the Common Logic Unit 50 and it additionally has means for operating ECC Modular Units 55, 56 together in a 9 bit SEC DED code. This will be explained in detail later. An ECC circuit 59 is shared by Level One Directory 23 and Level One Data Store 15. It comprises two ECC Modular Units 60, 61 and a Common Logic unit 62. Common Logic unit 62 is similar to Common Logic unit 57 of the Level Two Data Store 17 and additionally may contain means for sharing ECC circuit 59 between the Level One Directory 23 and the Level One Data Store 15 (or stores 15, 23 can be operated in a sequence to avoid a conflict). Time sharing the ECC circuit 59 for stores 15, 23 is particularly advantageous because store 15 does not respond to the address in register 12 until after the compare operation that is performed on the word fetched from store 23. Level Two Data Store 17 and Level Two Directory 24 are accessed at the same time in an operation that fetches four words from store 17, one of which may be the word of the virtual address in the register, as is decided by the operation of Compare circuit 43. Thus, the storage hierarchy system of FIG. 1 makes advantageous use of the modular construction of the ECC circuit of this invention. It will be helpful to next consider in detail the structure of the SEC DED code of an ECC modular unit.

The Odd Weight Code of FIG. 2

In the matrix of FIG. 2, the column headings identify 8 data bytes of 8 bits each, B1 through B8, and a set of 8 check bits. A 72 bit word that is read from store 23 or 24 can be thought of as having 64 data bits and 8 check bits aligned in the sequence of the column headings in FIG. 2. The row headings S1 through S8 identify the 8 syndrome bits. The 1 entries in a row of the matrix show the connections of the 72 bit positions of the storage data register to Exclusive OR circuits that form the syndrome bit of the row heading during a data fetch operation and the corresponding check bit during a data store operation. A check bit is the Exclusive OR function of each of the data and check bits for which there is a 1 entry. For example, check bit C1 is an Exclusive OR function of each data bit for which there is a 1 in row S1 of the matrix. Syndrome bit S1 is the Exclusive OR function of the data bits for which there is also a 1 entry. Thus, the matrix of FIG. 2 is a convenient illustration of both the logical structure of the codes and the physical structure of an encoding circuit.

In the code of FIG. 2, there is an odd number of entries in each column. In other words, each data bit enters into the Exclusive OR function of an odd number of check bits. The ECC circuit conventionally contains means for detecting an even number of 1 digits in the syndrome when an error is detected and for signalling that an uncorrectable double error has occurred. As has already been explained, one of the objects of this invention is to preserve this characteristic of the odd weight code when the code is used as a module of a larger code.

The code is constructed so that the same circuits that form the check bits can be used for forming the byte parity bits that are transmitted to the associated system (or to compare circuits 42, 43) on a fetch operation and for parity checking data words received in parity from the associated system. For example, check bit C1 is the Exclusive OR function of each bit of byte B1 and various other data bits. The Exclusive OR function of the 8 bits of byte B1 is the parity of this byte, and this parity bit is formed as a discrete signal that is applied to byte B1 when the data is transmitted to the associated system and is combined with other terms to form check bit C1 or syndrome bit S1.

The ECC Code Of This Invention — FIG. 3

FIG. 3 shows a convenient mathematical representation of the code of this invention. The term "H" identifies a matrix of the general type shown in FIG. 2, and H128 identifies a matrix for a SEC DED code for 128 data bits. The matrix H128 is made up of individual matrixes that are identified within the brackets in FIG. 3. Matrix H64 is preferably the 64 data columns of the matrix of FIG. 2. Matrix H' 64 is identical to matrix H64 except that one of its rows is complimented so that it is changed from an odd weight code to an even weight code. (This will be explained later.) The term I8 identifies an identity matrix of 8 rows and columns and is identical to the portion of FIG. 2 under the column heading "Check." The term 1 64 identifies 64 1 entries in a row of the matrix and the term 0 64 similarly identifies 64 0 entries. The term I1 continues the identity matrix into the ninth row of matrix H128.

The Modified Matrix — FIG. 4

FIG. 4 shows the entries for the matrix H'64 and 1 64 of FIG. 3. The columns are headed B9 through B16 for the lower half of the storage word that provides data bit entries to this module of the coding circuit. The row headings S9 through S16 correspond to the row headings S1 through S8 in FIG. 2 and row heading S17 identifies the additional bit required for checking 128 data bits.

Row S17 has a 1 in each entry, as FIG. 3 specifies. One of the rows, arbitrarily row S12, is the complement of the corresponding row (S4) in the matrix H64 of FIG. 2. The other rows of the matrix are identical to the corresponding rows of FIG. 2 and only the first few entries are shown in FIG. 4.

The matrix H'64 can be easily compared with the corresponding matrix H64 in FIG. 2 by first disregarding row S17 in FIG. 4. Bit position one of byte 1 in FIG. 2 enters into the check bits C1, C2 and C4. Bit 1 of byte 9, the corresponding bit position in the portion of the storage word encoded by the matrix H'64, enters into check bits C9 and C10 but not into bits C12. Thus, this data bit is encoded into only an even number of check bits in the matrix H'64. Similarly, data bit 2 of byte 1 enters into three check bits C1, C2 and C5 in the matrix H64 of FIG. 2 and the corresponding positions C9, C10, C13 in FIG. 4, but it also enters into the additional check bit term C12 in the modified matrix of FIG. 4. Thus, complementing the 0 in this column of FIG. 2 (which is represented by a blank) adds one to the number of check bits that are derived from this data bit and makes the number an even number. Thus, complementing a row of the odd weight code of matrix H64 produces an even weight code of H'64. However row S17 contains a 1 in each entry and thereby maintains the odd weight characteristic of the code.

Figure 5:
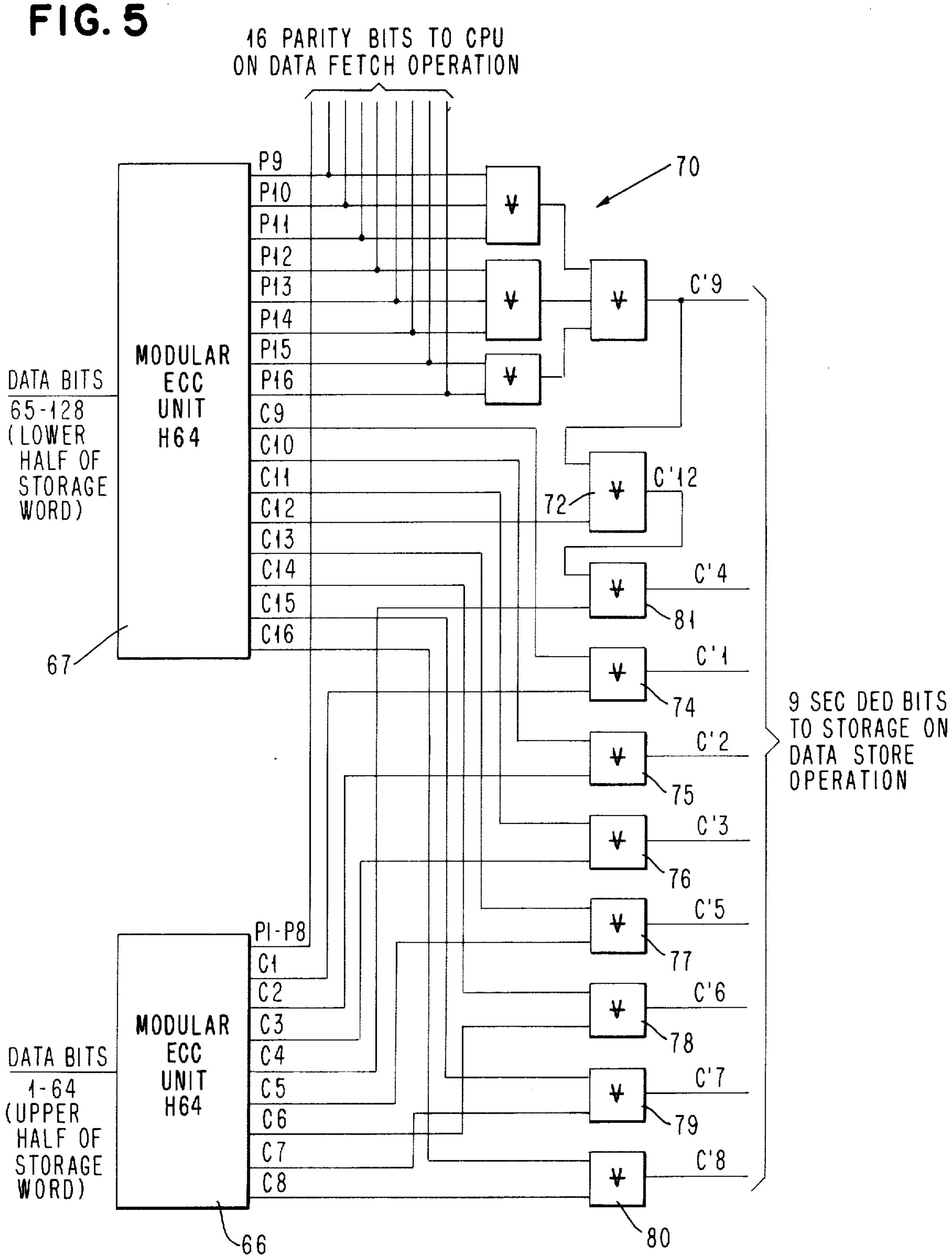
FIG. 5 is a logic circuit schematic of the error correction circuit of this invention.

The Circuit Of FIG. 5

The circuit of this invention can be implemented from the matrix of FIGS. 3 and 4 by conventional circuit techniques that are explained in detail in the patent to Hsiao et al. Preferably however, at a significantly high level of circuit integration, there is a tree like network of Exclusive OR circuits that is usable without change as a module in error correction circuits for data words of various widths. These units may be physically constructed as an integrated circuit component, such as a semiconductor chip, that is produced as a single part number and combined with other components in a larger circuit package. Each of these integrated units is constructed according to the matrix H 64 (equivalently H'64) and logic external to this integration unit forms the modified matrix. The error correction circuit of FIG. 5 includes two identical ECC modular units 66, 67 that receive data bit inputs as shown in FIG. 1 and produce 8 parity bits and 8 check bits. As has already been explained, the circuit of FIG. 2 produces the parity bits as an intermediate function of the Exclusive OR tree for parity checking data bytes that are transmitted to the associated system. According to this invention, these bits are used in generating the odd weight SEC DED code. The parity bits are identified as P1 through P8 for the upper half of the store and P9 through P16 for the lower half. Similarly, the check bits that are produced by the two modules are identified as C1 through C8 and as C9 through C16. The 9 check bits produced by this circuit are identified as C'1 through C'9.

As can be seen from the equation of FIG. 3 and from row S17 of the corresponding matrix of FIG. 4, check bit C'9 is the Exclusive OR function of each data bit 65 through 128 in the lower half of the storage word. As FIG. 2 shows, each parity bit is the Exclusive OR function of the data bits of one data byte, and accordingly, the Exlcusive OR function of the 8 parity bits P9 through P16 is the Exclusive OR function of each data byte in the upper half of the storage word. A network of Exclusive OR circuits 70 receives the 8 parity bits P9 through P16 and produces the check bit C'9. Thus, the additional check bit can be produced from outputs normally available from the modular ECC unit without modifying this unit. It is of course an advantage to store only the single check bit C'9 instead of equivalently storing the 8 parity bits P9 through P16.

Arbitrarily, row S12 has been chosen to be complemented in the matrix of FIG. 2. That is, the corresponding check bit is to be formed as the Exclusive OR function of data bits for which there is a zero (represented by a space) in row S4 of FIG. 2. (FIG. 4 shows this change.) (Remember that a 1 in the matrix of FIG. 2 represents a circuit connection and not a data value; the data value of check bit C12 for the complemental row is entirely independent of the data value of this bit if the row were not complemented.) The value of C12 for this complemented row S12 equals the Exclusive OR function of check bit C12 and every data bit. (The Exclusive OR function of every data bit equals the check bit C'9.) This can be understood from the associative property of the Exclusive OR function and it can be understood from a simple example: if there are an even number of 1 data bits in the entries that form check bit C4 (C4 = 0) and an odd number in the entire set of data bits (C'9 = 1), then there must be an odd number of 1 data bits in the complement of the set of data bits that form check bit C4. ($C1 \forall C'9 = 0 \forall 1 = 1$.) The example should also help to explain why the complement of a row in the matrix is entirely unrelated to the complement of the check bit values. In the circuit of FIG. 5, an Exclusive OR circuit 72 receives these inputs and produces the output which is designated C'12. Thus, the components that produce the outputs C9 – C11, C'12, and C13 – C16 implement the matrixes H'64 and 1 64 in FIGS. 3 and 4.

The check bits C'1 through C'3 and C'5 through C'8 are formed by a set of Exclusive OR circuits 74 through 80 that each receive a corresponding pair of check bits from each modular ECC unit 66, 67. The check bit C'4 is similarly formed by an Exclusive OR gate 81 that receives the check bit C4 from the lower matrix and the check bit C'12 at the output of Exclusive OR gate 72. (Gates 72 and 81 are equivalent to a single gate and are shown separately to simplify the explanation.)

Thus, the circuit of FIG. 5 receives 128 data bits and produces 9 SEC DED bits. On a store operation, these 9 bits are stored with the 128 data bits in a 137 bit word location of the associated store. On a subsequent fetch operation, the 128 data bits are encoded to form 9 check bits, as FIG. 5 shows. These newly encoded check bits are compared with the 9 check bits fetched from the store and 9 syndrome bits are formed by means of 9 Exclusive OR gates (not shown).

Other Embodiments Of The Invention

The error correction code of FIG. 2 and the modular SEC DED unit of FIGS. 3, 4 and 5 can be readily adapted to data words of various widths. However, the 8 bit code for a 64 bit word is much more efficient than the 7 bit code for a 32 bit word, and for many applications for the invention a modular unit for 128 data bits and 9 check bits will be undesirably large. The choice of 64 data bits (instead of some other number of data bits for which 8 SEC DED bits is the minimum SEC DED code) is based on the common organization of data into bytes of data bits; it is not necessary that the number of parity bits equal the number of SEC DED bits as happens to be the case for a modular unit in the preferred circuit. The code of FIG. 2 is constructed to form byte parity bits by means of the same components that form the SEC DED bits; this construction optomizes the code from the standpoint of the number of circuit components. Alternatively, the code may be constructed to optomize for a different consideration such as to enlarge the set of triple errors that can be detected. For these codes the parity bit C'9 can be formed from a separate bytl parity circuit, it can be formed as a function of various outputs available from the ECC Modular Unit, or each ECC Modular Unit can be arranged to provide bit C'9 directly and it can be connected as needed in the common logic unit.

A data store having an array of storage cells is an example of a data handling device for which Hamming codes are paricularly suited and are widely used. From a more general standpoint, the invention is useful whereever a data word is to be encoded in such a code.

ECC circuits for a larger data word can be constructed from the ECC modular unit and suitable common logic of the type described. Intermediate size data words can be encoded by applying fixed data values to the unused inputs, as already explained. Similarly, the ECC modular unit may contain components that are selectively connected only as needed and it may contain components for various other functions.

The system of FIG. 1 will suggest a variety of applications for the invention and those skilled in the art will recognize further variations of the preferred embodiment of the invention within the spirit of the invention and the scope of the claims.

What is claimed is:

1. A modular odd weight encoder for data words that are multiples of a predetermined number of data bits, comprising, first means for encoding a first set of data bits having said predetermined number of data bits to form a minimum number of SEC DED bits according to an odd weight code, second means for encoding a second set of data bits having said predetermined number of data bits to form a minimum number of SEC DED bits according to an even weight code and for forming a parity bit of all the data bits encoded in said even weight code, and means combining in an Exclusive OR function each SEC DED bit of said first encoding means with a SEC DED bit of said second encoding means to form SEC DED bits in an odd weight code for all the data bits encoded by said first and second encoding means, said parity bit forming an additional SEC DED bit for said data bits encoded by said first and second encoding means.

2. A circuit for correcting and detecting errors in a multi-bit word, comprising, a plurality of modular units, each modular unit including encoder means for operating on a predetermined number of input bits and producing a minimum number of SEC DED bits according to an odd weight code, means for connecting the encoder means of each unit to receive a different set of bits of said word, means for forming the parity of a first set of said sets of bits and means responsive to said parity and to the SEC DED bits of the encoders for said first set of bits to convert the SEC DED bits for said first set of bits to an even weight code, whereby the odd weight characteristic of the code is preserved, and means for producing the Exlcusive OR function of each SEC DED bit of said even weight code and the corresponding SEC DED bit of said even weight code and the corresponding SEC DED bit of the encoder means of a second modular unit for producing the minimum number of odd weight code bits for said first and said second set of bits of said word.

3. A circuit for correcting and detecting errors in a multi-bit word, comprising, a first modular unit including first encoder means for operating on a predetermined number of input bits and producing a minimum number of SEC DED bits according to an odd weight code, and means connecting said first encoder means to receive a first set of bits of said word, a second modular unit identical to said first modular unit having second encoder means, and means connecting said second encoder means to receive a second set of bits of said word, means for forming a parity bit of said first set of bits and means responsive to the parity of said first set and to one of the SEC DED bits produced by said first encoder means to produce a SEC DED bit that is an even weight function of the data bits of said first set that are not inputs in said first encoder means to the formation of said one of said SEc DED bits, and means for producing a SEC DED bit for said two sets of data bits as the Exclusive OR function of said even weight SEC DED bit and the corresponding SEC DED bit of said second encoder means and for producing other SEC DED bits for said two sets of data bits that are the Exclsuive OR function of other of the SEC DED bits of said first encoder means and the corresponding SEC DED bits of said second encoder means, said parity bit forming a SEC DED bit for said two sets of data bits.

4. The circuit of claim 3 including means connecting said means to produce said even weight code to be responsive to said parity bit.

5. The circuit of claim 4 wherein said first and second encoder means each include means producing a parity bit for each byte of input bits and said means for producing said parity bit of said first set of bits of said word includes an Exclusive OR circuit connected to receive said byte parity bits.

6. The circuit of claim 3 wherein said word is a word stored in a storage hierarchy system and said system comprises, a level one store and means supplying a virtual address having a portion defining a physical address location in said level one store, and means connecting said first modular unit to receive said first set of bits and said second modular unit to receive a said second set of bits from said level one store, a level one store directory accessible independently of said level one store according to a portion of said virtual address to access a location containing a word of one half the number of data bits of said level one word and means connecting said second modular unit to receive a word from said directory store, means responsive to the SEC DED bits of said second modular unit for connecting and detecting errors in a word of said directory store, and means responsive to said SEC DED bits for said two sets of data bits for connecting and detecting errors in said level one store.

7. The system of claim 6 including, a level two store, a level two directory store, an ECC circuit having two of said identical modular units for correcting and detecting errors in said level two store, and an ECC circuit having one of said identical modular units for independently correcting and detecting errors in said level two directory store.

* * * * *